Aug. 17, 1926.
W. H. T. HOLDEN ET AL
1,596,101
HIGH FREQUENCY SIGNALING SYSTEM
Filed Nov. 17, 1924
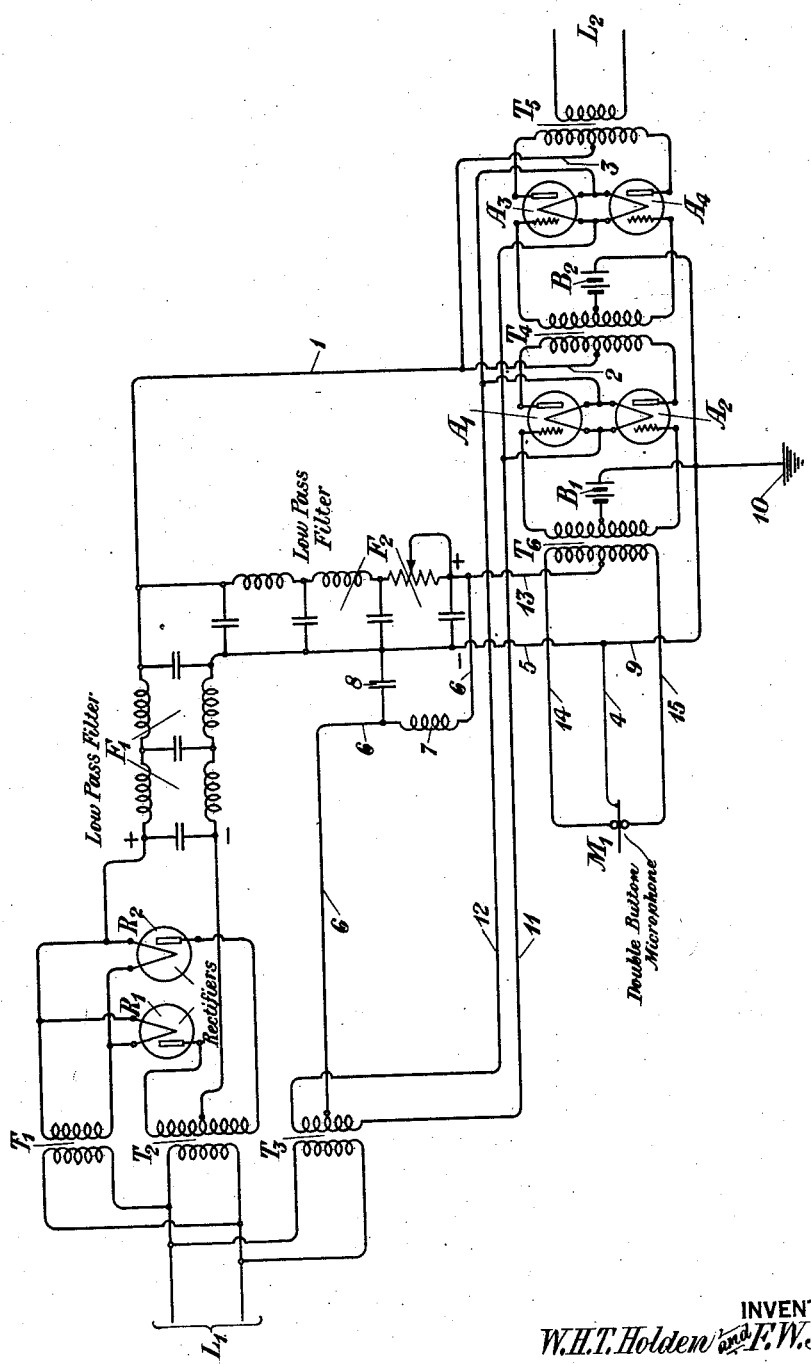
INVENTORS
W.H.T.Holden and F.W.Schramm
BY
ATTORNEY Patented Aug. 17, 1926.

1,596,101

UNITED STATES PATENT OFFICE.

WILLIAM H. T. HOLDEN AND FRED WILLIAM SCHRAMM, OF BROOKLYN, NEW YORK, ASSIGNORS TO AMERICAN TELEPHONE AND TELEGRAPH COMPANY, A CORPORATION OF NEW YORK.

HIGH-FREQUENCY SIGNALING SYSTEM.

Application filed November 17, 1924. Serial No. 750,369.

This invention relates to signaling systems, and particularly to means for deriving from an alternating current source the necessary unidirectional current for the proper operation of vacuum tubes and also for a microphone or other apparatus.

In the copending application of W. H. T. Holden, Serial No. 749,791, filed November 13, 1924, is disclosed a method and means for utilizing an alternating current source for providing the unidirectional potentials and currents necessary for the proper operation of vacuum tubes. In the system therein disclosed the space current flowing from the plates to the filaments of the power amplifier tubes is utilized for energizing the filaments of detector tubes. The space current of the power amplifier tubes is derived by rectifying an alternating current. This space current is particularly well suited for heating the filaments of the detectors, because after initial rectification and filtering it has been passed through the windings of the output transformers of the power amplifiers, which by virtue of their high inductance tend to further exclude any alternating components that may be present in the space current.

This invention resides in a method and means whereby the normal current required for a microphone may be derived from the space current of an amplifier, which space current is provided by the rectification of alternating current; and, whereby abnormal current requirements of the microphone are cared for directly from the rectifier which supplies the unidirectional current to the tubes of the amplifier.

This invention will be clearly understood from the following description when read in connection with the attached drawing showing schematically a form of embodiment of the invention.

In the drawing the line $L_1$ represents a source of alternating current as for example, a 110-volt houselighting system. This source is connected with a rectifier by means of the transformers $T_1$ and $T_2$. The line $L_1$ is also connected with a transformer $T_3$ for the purpose of energizing the filaments of the vacuum tubes of the power amplifier, which operation will later be described in detail. The rectifier comprises in part the tubes $R_1$ and $R_2$, the filaments of both of which are connected with the secondary winding of transformer $T_1$ in order to derive the necessary heating current. Transformer $T_2$ serves to impress upon the rectifier the alternating current that is to be rectified. As will be seen, one of the outer terminals of the secondary winding of $T_2$, is connected with the anode of rectifier $R_1$, and the other outer terminal of the secondary winding is connected with the anode of tube $R_2$. The midpoint of this winding is connected with the output circuit of the rectifier and constitutes the negative side of that circuit. The positive side of the output circuit is connected with the plates of the tubes $A_1$ to $A_4$, inclusive. Connected with the output circuit are the low-pass filters $F_1$ and $F_2$ comprising a plurality of series inductances and shunt capacities, which are so proportioned as to substantially suppress any alternating current components that may be present in the output circuit of the rectifier. The positive conductor joining filters $F_1$ and $F_2$ is connected by means of conductors 1 and 2 with the midpoint of the primary winding of transformer $T_4$, the terminals of which winding are connected with the plates of the tubes $A_1$ and $A_2$, constituting the first stage of the push-pull amplifier. The circuit just traced provides for the application of the positive potential to the plates of the said tubes. In like manner a positive direct potential is applied to the plates of tubes $A_3$ and $A_4$, over conductors 1 and 3, which is connected with the midpoint of the primary winding of transformer $T_5$. The tubes last mentioned constitute the second stage of the said push-pull amplifier. The filaments of all of the tubes of this amplifier are rendered active by current derived from the alternating current source $L_1$ through the transformer $T_3$. The secondary winding of transformer $T_5$ is connected with the output circuit $L_2$ so that the amplified currents will be impressed thereon. A microphone $M_1$ is connected with the push-pull amplifier by the transformer $T_6$, which has its primary winding connected with the microphone circuit and its secondary winding connected with the amplifier. The outer terminals of the primary winding of transformer $T_6$ are connected with the buttons of the microphone. The diaphragm is connected by conductors 4 and 5 with the negative side of the filter $F_2$. The midpoint of the primary winding of $T_6$ is connected not only with the positive side of the filter $F_2$ but is also connected by conductor 6 with the midpoint of the secondary winding of transformer $T_3$. This conductor has in series therein an inductance 7, and has also in parallel therewith a condenser 8. The function of the inductance 7 and condenser 8 is to exclude any alternating current component that may be present in the space current of the amplifier tubes, from getting into the microphone circuit. The diaphragm of the microphone is also connected by conductors 4 and 9 to ground. The necessary negative potential for the grids of the tubes of the amplifier is provided by the batteries $B_1$ and $B_2$ which are grounded at the point 10. It is to be understood, however, that the necessary grid biasing potential for the operation of these tubes could be derived in the same manner in which it is derived in the system shown in the copending application of Holden, referred to hereinbefore.

From the foregoing description of the circuit in which the invention is embodied it will be seen that when an alternating potential is impressed upon the line $L_1$ the filaments of the rectifying tubes $R_1$ and $R_2$ will be energized through the transformer $T_1$ and the alternating current through the transformer $T_2$ will be rectified so that a direct potential will be impressed across the output circuit of the rectifier. At the same time the filament of the tubes $A_1$ to $A_4$, inclusive, of the amplifier, will be energized through the transformer $T_3$. When the filaments of the amplifier tubes are energized and a positive potential has been applied to the plates of the said tubes from the positive side of the output circuit of the rectifier through the low-pass filter $F_1$, through conductors 1 and 2 to the plates of $A_1$ and $A_2$ and through conductors 1 and 3 to the plates of $A_3$ and $A_4$, a space current will flow from the positive side of the rectifier output circuit over conductors 1, 2 and 3, through the evacuated space between the plates and the filaments of the tubes, thence over conductors 11 and 12 in parallel to the secondary winding of transformer $T_3$ to the midpoint thereof, thence over conductors 6 and 13 to the midpoint of the primary winding of transformer $T_6$, thence through conductors 14 and 15 in parallel to and through the microphone $M_1$, thence over conductors 4 and 5 to the negative side of filters $F_2$ and $F_1$. The space currents of the type of tubes normally used in power amplifiers would be sufficient to supply the normal operating current for the microphone $M_1$. In order to provide for a current in excess of that normally required, the output circuit of the rectifier is connected directly with the microphone circuit through the filters $F_1$ and $F_2$. This connection is in parallel with the circuit through which the space current of the amplifier was supplied to the microphone circuit.

It will accordingly be seen that by means of our invention the space current of the amplifier is used to supply the normal operating energy of the microphone. This current is singularly free from any alternating current components not only because it has been passed through the filter $F_1$ but also because of the high inductance of the primary windings of the transformers $T_4$ and $T_5$ through which it passes to the plates of the amplifier tubes. The excess current requirement of the microphone circuit is cared for by the direct connection between the rectifier and the microphone circuit through the filters $F_1$ and $F_2$. Such an arrangement provides not only for the operation of vacuum tubes but also a microphone from an alternating current source.

While this invention has been disclosed schematically in a certain form, it is to be understood that it is capable of embodiment in other and different forms without departing from the spirit and scope of the appended claims.

What is claimed is:—

1. In an amplifying system, the combination with a push-pull amplifier having a plurality of tubes of a source of alternating current, a rectifier connected with the said source, a microphone, means for energizing the filaments of the amplifier tubes with alternating current, means for applying a rectified voltage to the plates of the amplifier tubes, and means for utilizing the space currents of the said tubes to energize the microphone.

2. In an amplifying system, the combination with a push-pull amplifier having a plurality of tubes of a source of alternating current, a rectifier connected with the said source, a microphone, means for energizing the filaments of the amplifier tubes with alternating current, means for applying a rectified voltage to the plates of the amplifier tubes, means for utilizing the space currents of the said tubes to energize the microphone, and a secondary supply for the said microphone consisting of a direct connection between the rectifier and the said microphone.

3. In an amplifying system, the combination with a vacuum tube amplifier of a microphone connected therewith, a source of alternating current, a rectifier, a filter connected with the output side of the rectifier to eliminate alternating current components, means to energize the filaments of the vacuum tubes of the amplifier by alternating current, means to impress the rectified voltage upon the plate of the said tube, means for utilizing the space current of the tubes to energize the microphone, and a secondary source of energizing current for the said microphone comprising a connection between the said filter and the said microphone.

In testimony whereof, we have signed our names to this specification this 14th day of November, 1924.

WILLIAM H. T. HOLDEN.
FRED WILLIAM SCHRAMM.